United States Patent
Zhang

(10) Patent No.: US 11,850,544 B2
(45) Date of Patent: Dec. 26, 2023

(54) PARALLEL PIPE TYPE GAS ADSORPTION AND CONCENTRATION APPARATUS

(71) Applicant: SHANGHAI SHENCHENG ENVIRONMENTAL PROTECTION EQUIPMENT & ENGINEERING CO., LTD., Shanghai (CN)

(72) Inventor: Chuanzhong Zhang, Shanghai (CN)

(73) Assignee: SHANGHAI SHENCHENG ENVIRONMENTAL PROTECTION EQUIPMENT & ENGINEERING CO., LTD., Shanghai (CN)

(*) Notice: Subject to any disclaimer, the term of this patent is extended or adjusted under 35 U.S.C. 154(b) by 99 days.

(21) Appl. No.: 17/597,188

(22) PCT Filed: Jun. 2, 2020

(86) PCT No.: PCT/CN2020/093910
§ 371 (c)(1),
(2) Date: Dec. 28, 2021

(87) PCT Pub. No.: WO2020/259226
PCT Pub. Date: Dec. 30, 2020

(65) Prior Publication Data
US 2022/0305430 A1 Sep. 29, 2022

(30) Foreign Application Priority Data
Jun. 28, 2019 (CN) .......................... 201910612326.2

(51) Int. Cl.
*B01D 53/04* (2006.01)
*B01D 46/24* (2006.01)

(52) U.S. Cl.
CPC .... *B01D 53/0438* (2013.01); *B01D 2257/708* (2013.01); *B01D 2257/90* (2013.01); *B01D 2259/404* (2013.01); *B01D 2259/4009* (2013.01)

(58) Field of Classification Search
CPC ............ B01D 53/0438; B01D 53/0407; B01D 53/0462; B01D 2258/06; B01D 2259/4009; B01D 2259/404; Y02A 50/20
(Continued)

(56) References Cited

U.S. PATENT DOCUMENTS 9,023,244 B2  5/2015  Jadhav
9,943,803 B2  4/2018  Fredenhagen

FOREIGN PATENT DOCUMENTS

CN  1381306 A    11/2002
CN  201949749 U   8/2011
(Continued)

OTHER PUBLICATIONS

International Search Report and Written Opinion issued for International Patent Application No. PCT/CN2020/093910, dated Sep. 1, 2020, 15 pages including English translation.

*Primary Examiner* — Frank M Lawrence, Jr.
(74) *Attorney, Agent, or Firm* — Hamre, Schumann, Mueller & Larson, P.C.

(57) ABSTRACT

An apparatus is used for concentrating malodorous organic pollutant waste gas by using an adsorption method. The specific solution is to provide a plurality of parallel fixed-bed adsorbers and a set of movable hot air desorption apparatuses which can be connected to at least one of the plurality of parallel fixed-bed adsorbers in sequence, and to respectively complete desorption of all parallel fixed adsorbent beds by means of the movable hot air desorption apparatuses. In the improved solution, the movable hot air desorption apparatus is connected to two adsorption units,
(Continued)

and a regenerative heat exchange apparatus is provided on an inlet and outlet pipeline of the hot air desorption apparatus. The desorption process of the regenerative fixed-bed adsorbers is changed from concentrated desorption requiring high-power energy consumption to stepwise desorption requiring low-power energy consumption.

5 Claims, 10 Drawing Sheets

(58) Field of Classification Search
USPC .................. 96/121, 126, 122, 143, 144, 146
See application file for complete search history.

(56) References Cited

FOREIGN PATENT DOCUMENTS

| | | | |
|---|---|---|---|
| CN | 202478779 U | | 10/2012 |
| CN | 205199309 U | | 5/2016 |
| CN | 207056268 U | | 3/2018 |
| CN | 109012014 A | | 12/2018 |
| CN | 208742215 U | | 4/2019 |
| CN | 110772927 | | 2/2020 |
| KR | 102016018696 A | * | 11/2016 |
| SU | 405565 A1 | | 11/1973 |

* cited by examiner

PARALLEL PIPE TYPE GAS ADSORPTION AND CONCENTRATION APPARATUS

TECHNICAL FIELD

The present invention relates to a gas adsorption concentration apparatus, and further relates to an apparatus for concentrating malodorous organic pollution waste gases by using an adsorption method.

BACKGROUND ART

Gas concentration technologies using an adsorption method have been more and more widely applied in the field of pollution control of atmospheric volatile organic compounds (VOCs). Common gas adsorption concentration apparatuses include rotary adsorbers and regenerative fixed-bed adsorbers. These methods aim to concentrate adsorbable pollutants and to oxidize them into harmless simple compounds such as water and carbon dioxide by using an associated destruction apparatus such as a thermal oxidation destruction apparatus (TO), or to further separate, collect and recycle these adsorbable pollutants. At present, these adsorption concentration technologies are mostly used in industrial application scenarios where a continuous operation is performed and flow and concentration of source gases are relatively stable, and the device costs are generally high. With the improvement of environmental protection standards, these technologies have also been used for pollution control of high-concentration malodorous gases, which are difficult to remove effectively by other treatment means, such as low-temperature plasma and photocatalysis treatment technologies. Compared with the treatment of VOCs, these pollutants have low concentrations, low calorific values and long adsorption-desorption cycles. If a current gas concentration technology using an adsorption method is used in cooperation with a commonly used destruction technology, although the pollution of these malodorous gases can be completely eliminated, high-cost devices with high power and large treatment capacity and supporting sites, power supply, gas and other facilities are an unnecessary waste of resources.

SUMMARY OF THE INVENTION

The present invention discloses a gas adsorption concentration apparatus, which can solve the problem of large-flow and low-concentration malodorous pollution with low-cost devices.

This gas adsorption concentration apparatus can also be used for treatment of volatile organic pollutants (VOCs) waste gases similar to the odor pollution situation described above. For ease of description, malodorous waste gases and volatile organic pollutants are collectively referred to herein as adsorbable pollutants as required. Similarly, a polluted gas requiring concentration treatment is referred to as an adsorbate gas, and a medium gas for desorption and regeneration of an adsorbent bed are referred to as a desorptive gas.

A specific solution of such a gas adsorption concentration apparatus is to provide a plurality of parallel fixed-bed adsorbers working simultaneously and a set of movable hot air desorption apparatuses which can be connected to at least one of the plurality of parallel fixed-bed adsorbers in sequence, and to respectively complete desorption of all parallel fixed adsorbent beds by means of the movable hot air desorption apparatuses.

The most basic specific technical solution comprises a housing, an adsorber gas inlet, an adsorber gas outlet, a plurality of adsorption units and a set of movable desorption apparatuses. The adsorption unit is a small fixed-bed adsorber, and comprises two head ends capable of allowing an adsorbate gas and a desorptive gas to enter and exit the adsorber. All the adsorption units are arranged in parallel and connected via a supporting connection structure to form an airtight adsorption core, such that a adsorbate gas entering the housing from the adsorber gas inlet can reach the adsorber gas outlet only by passing through the adsorption units of the adsorption core. The movable desorption apparatus is composed of a hot air desorption apparatus and a mechanical movement apparatus. The hot air desorption apparatus can be connected to at least one of the fixed-bed adsorption units in sequence, and is in communication with a peripheral desorptive gas supply apparatus and a peripheral desorptive gas treatment apparatus respectively by means of flexible pipelines, such that a desorptive gas from the desorptive gas supply apparatus passes through the adsorption units to the desorptive gas treatment apparatus. A gas heating apparatus is provided at an appropriate part of a desorptive gas passage to heat the desorptive gas to an appropriate temperature required for desorption and regeneration of the adsorbent beds in the adsorption units. The mechanical movement apparatus supports the hot air desorption apparatus and drives the hot air desorption apparatus under the drive of controlled power to complete connection and switching with each adsorption unit in sequence.

According to an improved solution of the gas adsorption concentration apparatus described above, an adsorption unit group composed of two adsorption units serves as a functional unit in the desorption process. The hot air desorption apparatus enables two head ends on one side of the adsorption unit group to be respectively in communication with the desorptive gas supply apparatus and the desorptive gas treatment apparatus by means of flexible pipelines, and this part of the hot air desorption apparatus is called an IO end. Two head ends on the other side of the adsorption unit group are in communication with a pipeline including the gas heating apparatus, and this part of the hot air desorption apparatus is called a CA end.

According to a further improved solution of the gas adsorption concentration apparatus described above, in particular, a heat exchange apparatus is provided at the IO end of the hot air desorption apparatus, and the heat exchange apparatus serves to perform heat exchange between two desorptive gas pipelines passing through the IO end.

In a specific solution of the above improvement, the heat exchange apparatus is a regenerative heat exchanger.

In a further embodiment of the above improvement, the regenerative heat exchanger is a rotary heat exchanger with an intermittent heat accumulator.

With regard to the optimization of the number and arrangement mode of the adsorption units, a plurality of parallel fixed-bed adsorption units are arranged in a matrix, and the array arrangement allows a trajectory formed by pairing the adjacent fixed-bed adsorption units in up-down and left-right directions to rightly form a curve covering all the fixed-bed adsorption units.

With regard to further optimization of the number and arrangement mode of the adsorption units, the curve is an end-to-end closed curve.

With regard to the improvement of the adsorbate gas treatment capacity of a single apparatus, the specific solution is that the adsorption core is configured to be of a modular structure which can be transversely expanded and longitudinally stacked, and the movable desorption apparatus is also configured to be of a flexible expansion structure with an expandable coverage range.

The essence of the positive effect of the present invention is to change the desorption process of a regenerative fixed-bed adsorber from concentrated desorption requiring high-power energy consumption to stepwise desorption requiring low-power energy consumption, and to make full use of thermal energy in the desorption process by using two adsorption units in series to recover the heat absorbed by an adsorbent and using the heat in the discharged desorptive gas recovered during heat exchange between gases, so that the demand of the gas adsorption concentration apparatus for associated energy supply, such as power supply is reduced, and the overall energy consumption is also reduced, providing significant economic and social benefits.

The present invention is further described below in detail in combination with embodiments.

DETAILED DESCRIPTION OF EMBODIMENTS

Embodiment 1

Figure 1:
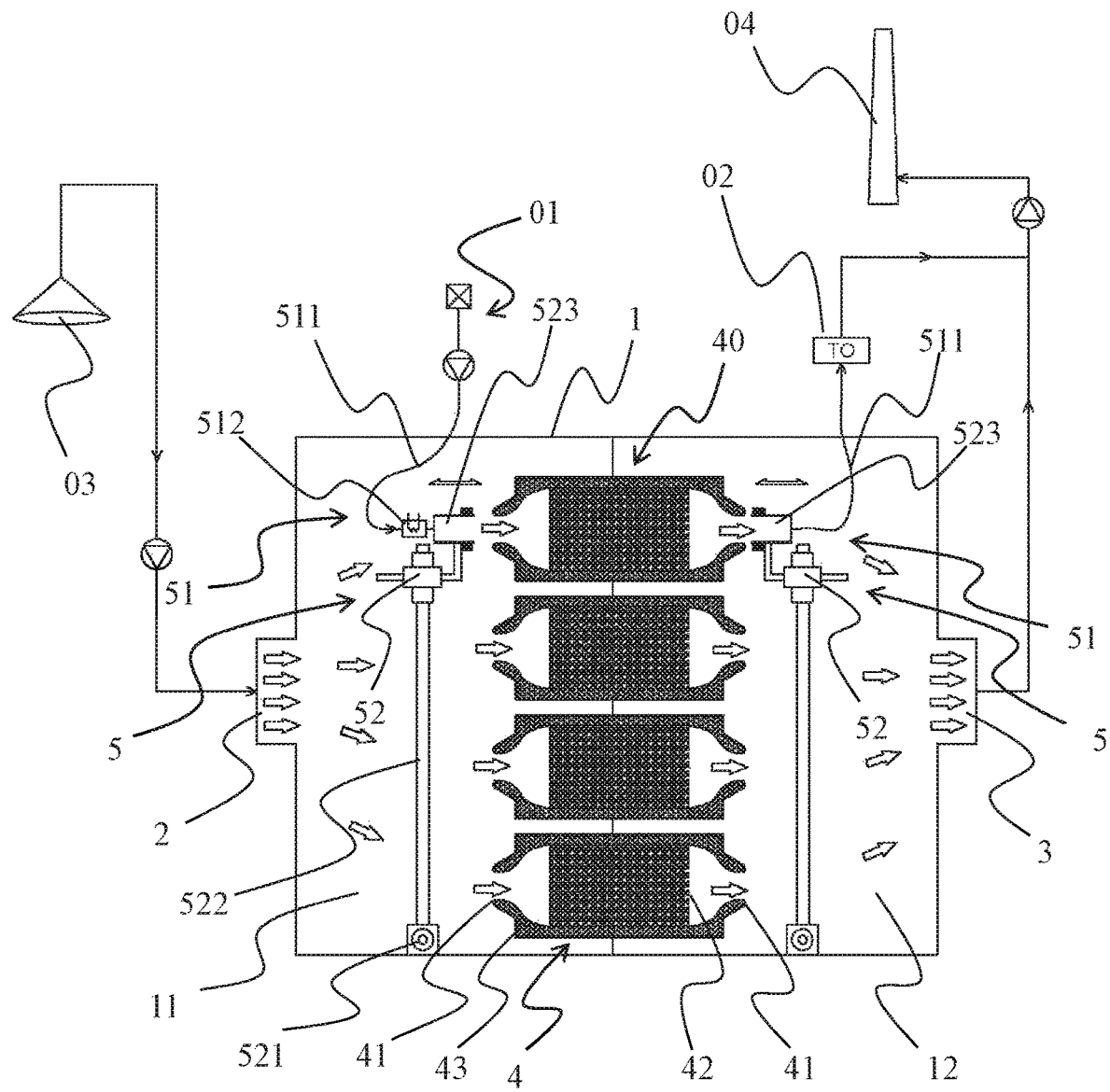
FIG. 1 is a schematic diagram of a basic structure of a gas adsorption concentration apparatus in an adsorption state.

See FIG. 1 for the most basic technical solution of a gas adsorption concentration apparatus.

The gas adsorption concentration apparatus comprises a housing 1, an adsorber gas inlet 2, an adsorber gas outlet 3, a plurality of adsorption units 4 and a set of movable desorption apparatuses 5. Each of the adsorption units is a small fixed-bed adsorber, comprises two head ends 41 capable of allowing an adsorbate gas and a desorptive gas to enter and exit the adsorber, and is internally provided with an adsorbent 42 and a thermal insulation material 43. All the adsorption units are arranged in parallel and connected via a supporting connection structure to form an airtight adsorption core 40, such that an adsorbate gas entering the housing 1 from the adsorber gas inlet 2 can reach the adsorber gas outlet 3 only by passing through the adsorption units 4 of the adsorption core 40. The movable desorption apparatus is composed of a hot air desorption apparatus 51 and a mechanical movement apparatus 52. The hot air desorption apparatus 51 can be connected to one of the adsorption units in sequence, and is in communication with a peripheral desorptive gas supply apparatus 01 and a peripheral desorptive gas treatment apparatus 02 respectively by means of flexible pipelines 511, such that a desorptive gas from the desorptive gas supply apparatus 01 passes through the adsorption units 4 to the desorptive gas treatment apparatus 02. A gas heating apparatus 512 is provided between the desorptive gas supply apparatus 01 and the adsorption units 4. The mechanical movement apparatus 52 supports the hot air desorption apparatus 51 and moves on a horizontal track 521 and a vertical track 522 under the drive of controlled power, to complete connection and switching between the hot air desorption apparatus 51 and each adsorption unit 4 in sequence by means of a telescopic interface 523.

The operation of the device comprises two operation processes, namely, an adsorption process and a desorption process.

In the desorption process, polluted air delivered from a pollution gas (or mixed gas) collection apparatus 03, as shown by the hollow arrow, enters an air intake static-pressure tank 11, which is composed of the housing 1 and the adsorption cores 40, from the adsorber gas inlet 2, and then enters each adsorption unit 4 respectively; the adsorbent 42 in the adsorption units adsorbs adsorbable pollutants retained in the polluted air; clean air flows out from the other end of the adsorption unit 4 and enters an exhaust gas collection tank 12, which is composed of the housing 1 and the adsorption cores 40; and finally, the clean air is discharged from the adsorber gas outlet 3 into the atmosphere via a pipeline and a chimney 04.

Figure 2:
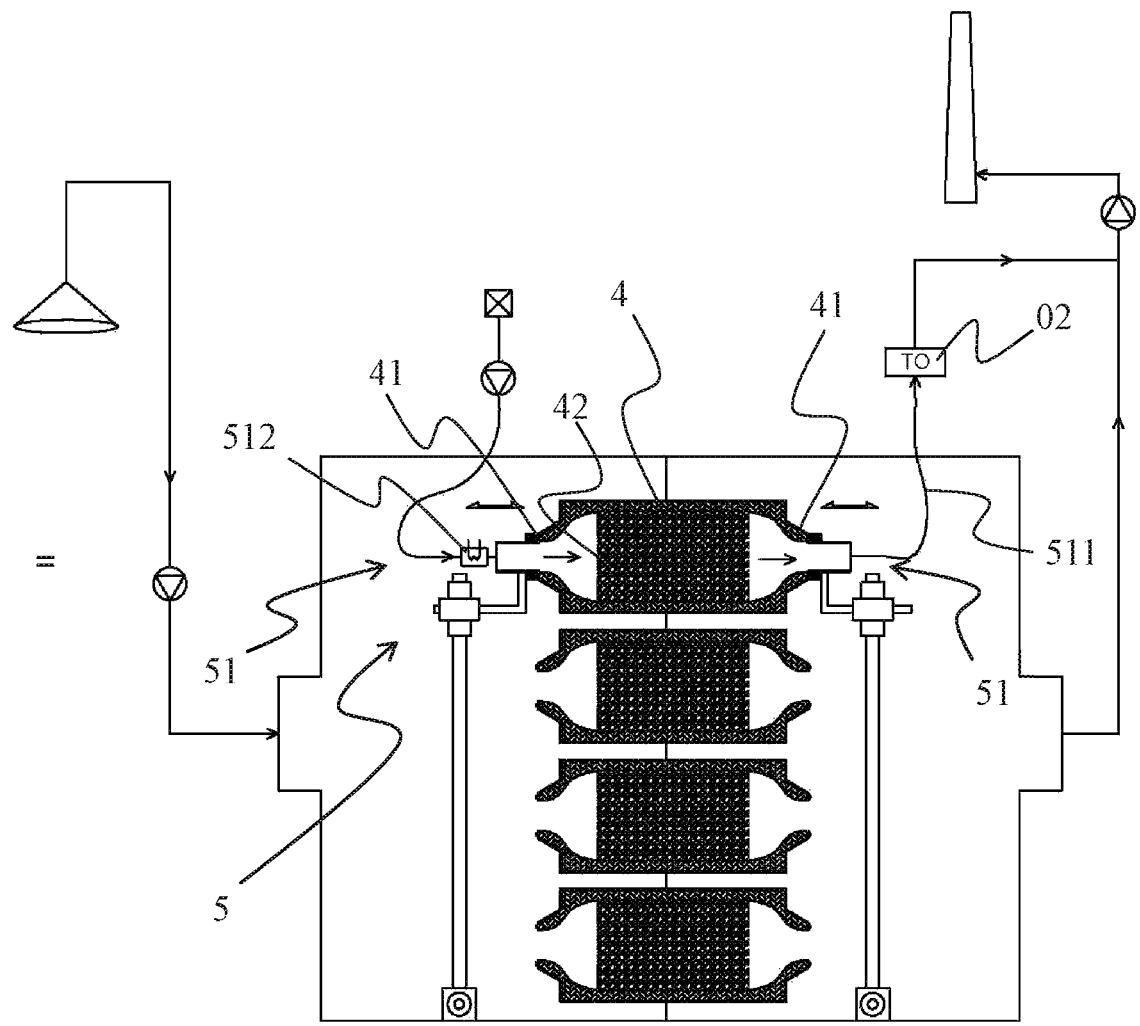
FIG. 2 shows the apparatus of FIG. 1 in a desorption state.

In the desorption process, referring to FIG. 2, after the adsorbent 42 in an adsorption unit 4 adsorbs a certain amount of pollutants, it has a reduced adsorption capacity and tends to be unable to effectively treat the polluted air, and the adsorption process ends. The hot air desorption apparatus 51 of the movable desorption apparatus 5 is docked with two head ends 41 of the adsorption unit 4, and the desorptive gas delivered from the desorptive gas supply apparatus, as indicated by a thin arrow, is heated by the gas heating apparatus 512 to a predetermined desorption temperature, enters the adsorption unit, heats the adsorbent 42 in the adsorption unit 4, is discharged from the other head end 41 of the adsorption unit 4 while carrying pollutants overflowing from the adsorbent, and is delivered to the adsorbate gas treatment apparatus 02 (which is a thermal oxidation destruction apparatus TO here) via the flexible pipeline 511, and is then discharged to the chimney.

When one adsorption unit has completed desorption and regeneration, the hot air adsorption apparatus is detached from the adsorption unit and moved to the next adsorption unit and joined with the next adsorption unit under the drive of the mechanical movement apparatus, and the above-mentioned desorption process is repeated.

The peripheral desorptive gas supply apparatus 01 and the peripheral desorptive gas treatment apparatus herein are not necessarily installed, and when the desorptive gas is possibly ordinary air without the need for treatment, or the desorptive gas discharged during desorption can be discharged into the atmosphere without the need treatment, the flexible pipeline 511 can be directly in communication with the space outside the housing 1 of the gas adsorption concentration apparatus.

Embodiment 2

Figure 3:
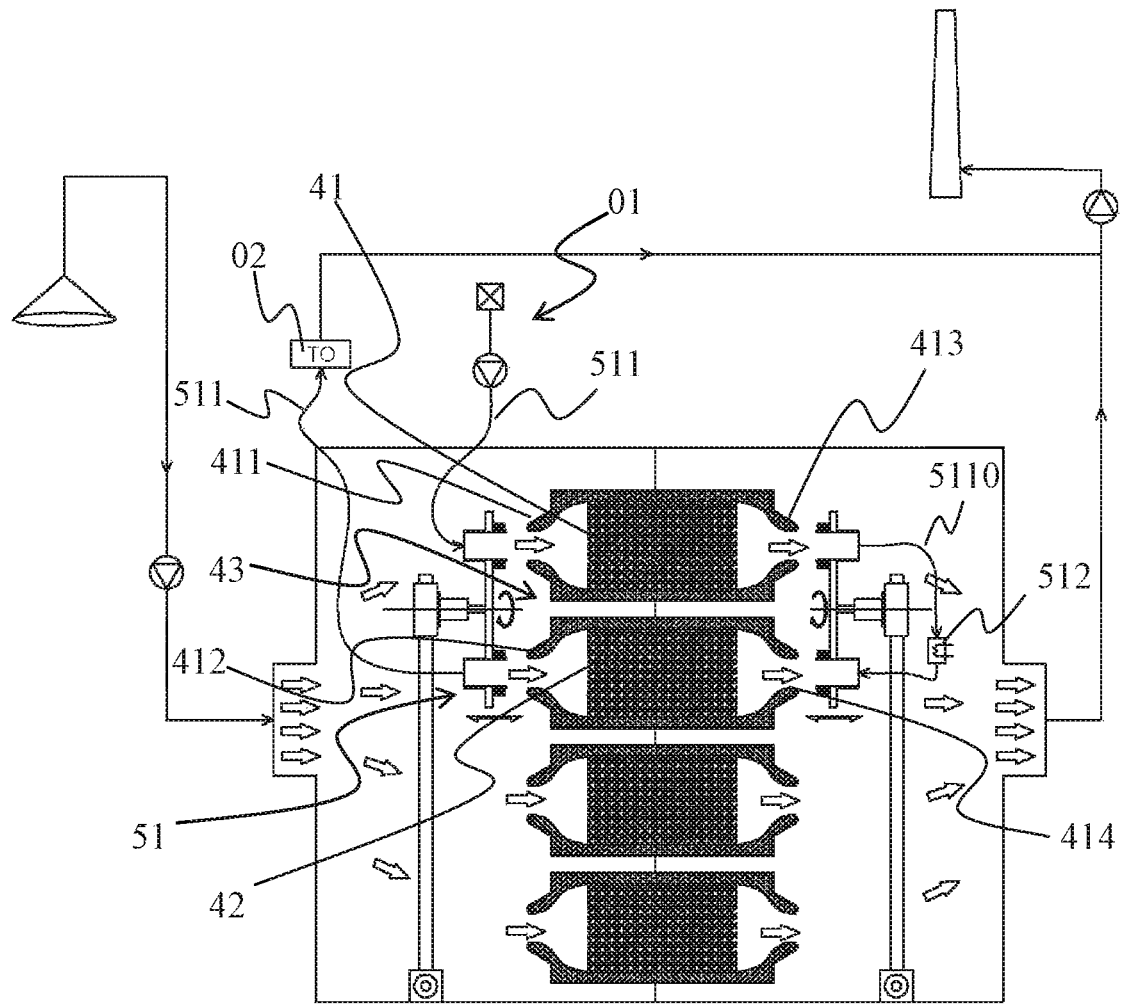
FIG. 3 shows an adsorption unit group consisting of two adsorption units as a functional unit in a desorption process.

Referring to FIG. 3, an adsorption unit group 43 composed of two adsorption units serves as a functional unit in the desorption process.

On the basis of Embodiment 1, the adsorption unit group 43 composed of two adsorption units 4-1 and 4-2 serves as a functional unit in the desorption process. The hot air desorption apparatus 51 enables two head ends 411 and 412 on one side of the adsorption unit group to be respectively in communication with the desorptive gas supply apparatus 01 and the desorptive gas treatment apparatus 02 by means of flexible pipelines 511, and this part of the hot air desorption apparatus is called an IO end. The two head ends 413 and 414 on the other side of the adsorption unit group are in communication with a short communication pipe 5110 including the gas heating apparatus 512, and this part of the hot air desorption apparatus is called a CA end.

When the apparatus is in operation, the adsorption process is the same as that in Embodiment 1.

Figure 4:
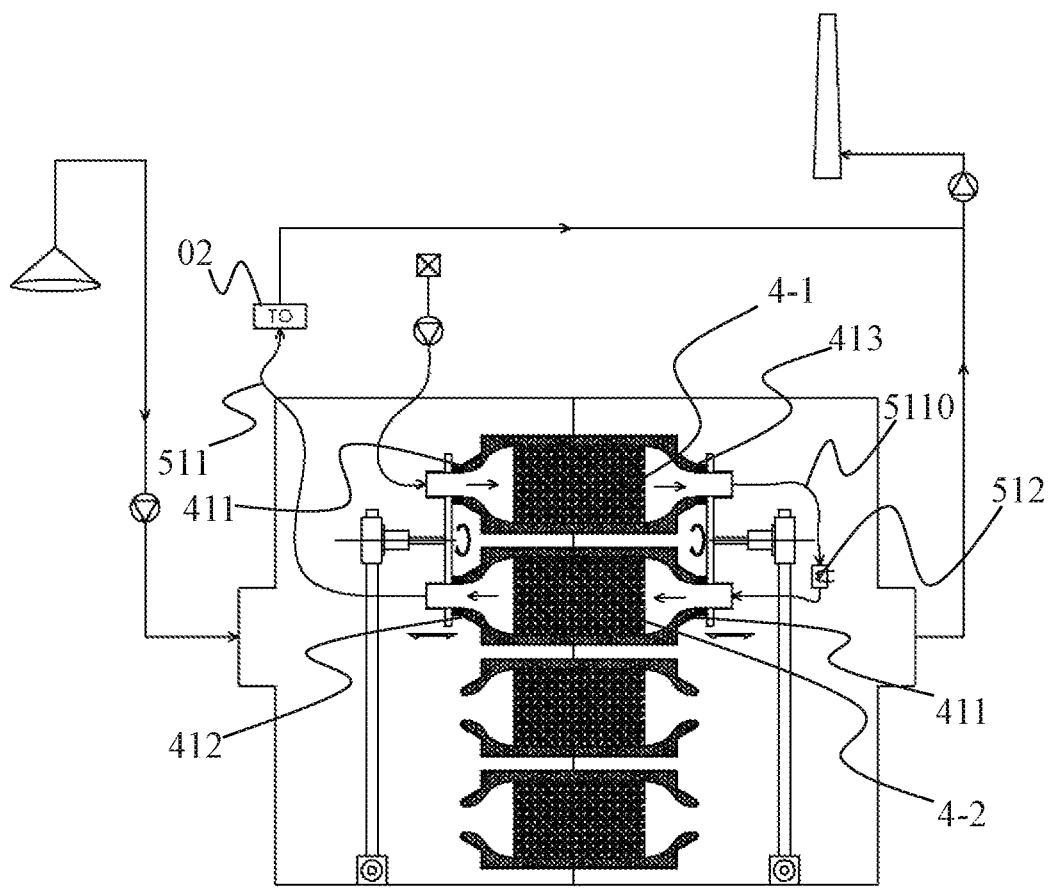
FIG. 4 shows the apparatus of FIG. 3 in the desorption state.
Figure 5A:
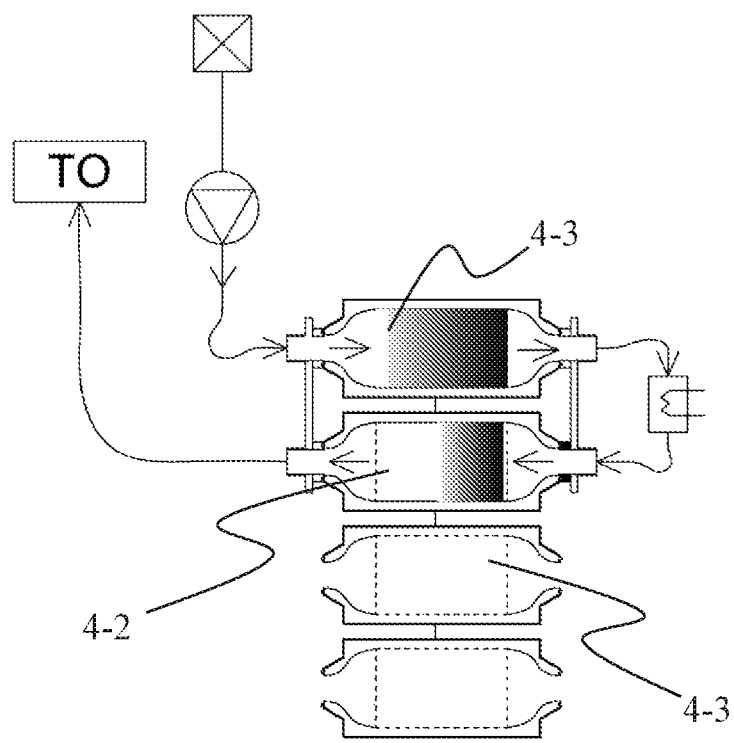
FIGS. 5a-b are simplified schematic diagrams of the apparatus of FIG. 3, illustrating heat transfer in the desorption process.
Figure 5B:
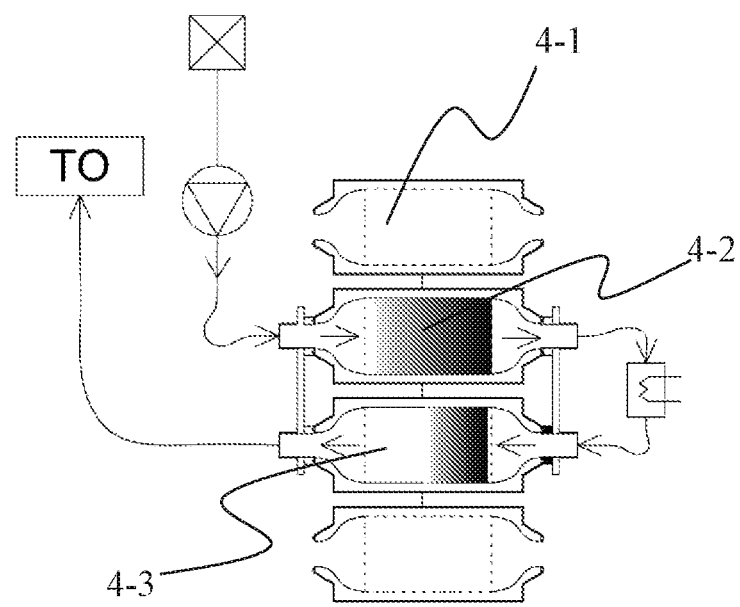

See FIG. 4 for a desorption state and FIGS. 5a-b for the desorption process. After the movable desorption apparatus is joined with the corresponding adsorption unit group, the desorptive gas delivered by the desorptive gas supply apparatus enters the adsorption unit 4-1 by means of the head end 411 of the adsorption unit, then enters the short communication pipe 5110 from the other head end 413, is heated by the gas heating apparatus 512 to a predetermined desorption temperature, then enters the adsorption unit 4-2 through the head end 411 of the adsorption unit to rise the temperature of the adsorbent therein for desorption, and finally is delivered to the desorptive gas treatment apparatus 02 by means of the head end 412 of the adsorption unit and the flexible pipeline 511. After the adsorption unit 4-2 completes desorption, the movable desorption apparatus is detached from the adsorption units 4-1 and 4-2, and is moved to be joined with a new adsorption unit group composed of the adsorption units 4-2 and 4-3, and the above-mentioned desorption process is repeated.

It is different from the case in Embodiment 1 that the desorptive gas first entering the adsorption unit 4-2 absorbs the heat absorbed by the adsorbent in the desorption process of the previous adsorption unit 4-1, has the temperature itself raised, and reaches the predetermined desorption temperature by absorbing less heat when being heated by the gas heating apparatus 512, while the adsorbent in the adsorption unit 4-1 is cooled in this process, and can more quickly enter a low-temperature state required for the adsorption process.

In conclusion, the desorption process of the apparatus in Embodiment 2 is more energy-saving than that in Embodiment 1, and can be switched to the adsorption process immediately after the desorption is completed.

Embodiment 3

The hot air desorption apparatus is provided with a heat exchange apparatus, see FIGS. 6-7 and 8a-d.

Figure 6:
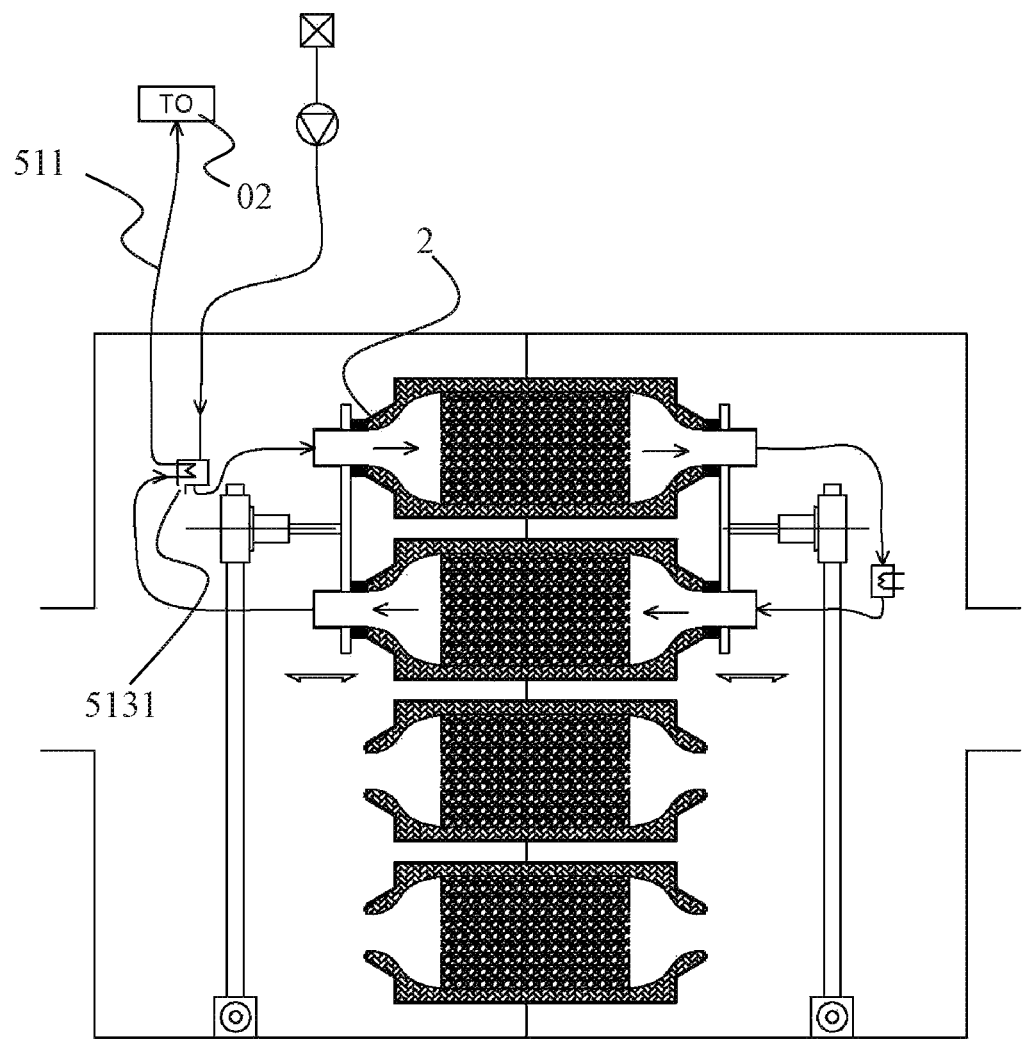
FIG. 6 shows a hot air desorption apparatus provided with a partition wall type heat exchange apparatus.

In the desorption processes of the previous two embodiments, when the desorption of the adsorption unit is to be completed, the desorptive gas delivered from the head end 41 of the adsorption unit and the flexible pipeline 511 to the desorptive gas treatment apparatus 02 is high-temperature gas, and the heat carried in this part of gas is wasted and makes the flexible pipeline 511 in a high-temperature state. A solution is to provide a heat exchanger between two flexible pipelines 511 leading to and out of the head end 412 of the adsorption unit of the hot air desorption apparatus, and a relatively simple solution is to provide a partition wall type heat exchanger 5131, as shown in FIG. 6.

Figure 7:
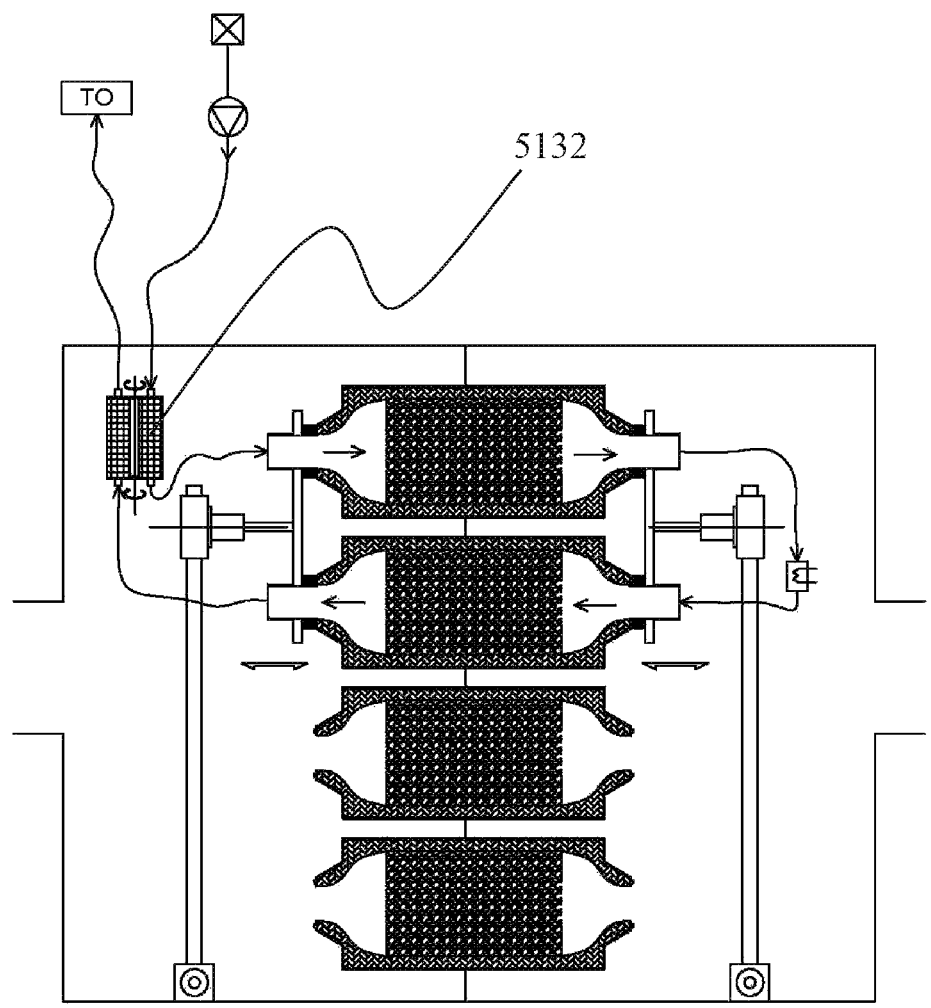
FIG. 7 shows a hot air desorption apparatus provided with a rotary heat exchanger with an intermittent heat accumulator.
Figures 8A, 8B:
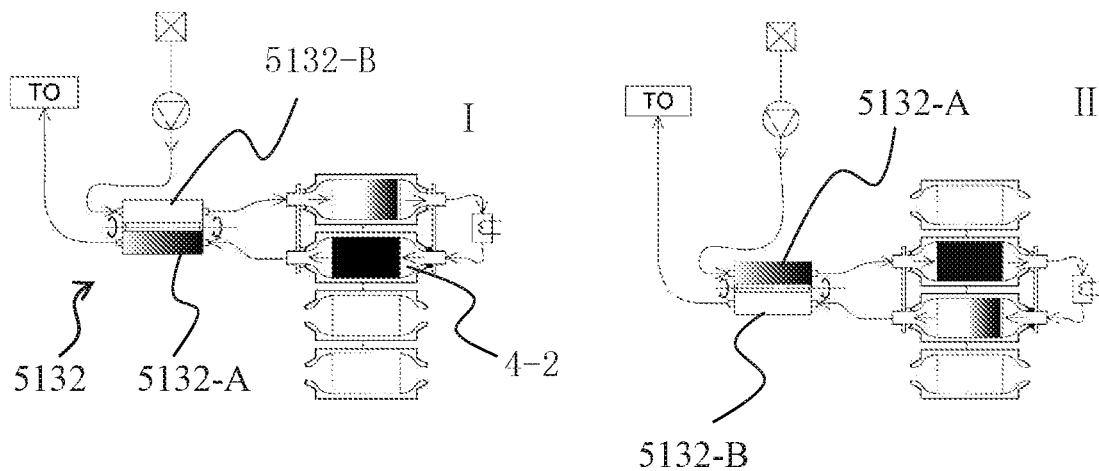
FIGS. 8a-d are schematic diagrams of the heat transfer process during operation of the rotary heat exchanger with the intermittent heat accumulator.
Figures 8C, 8D:
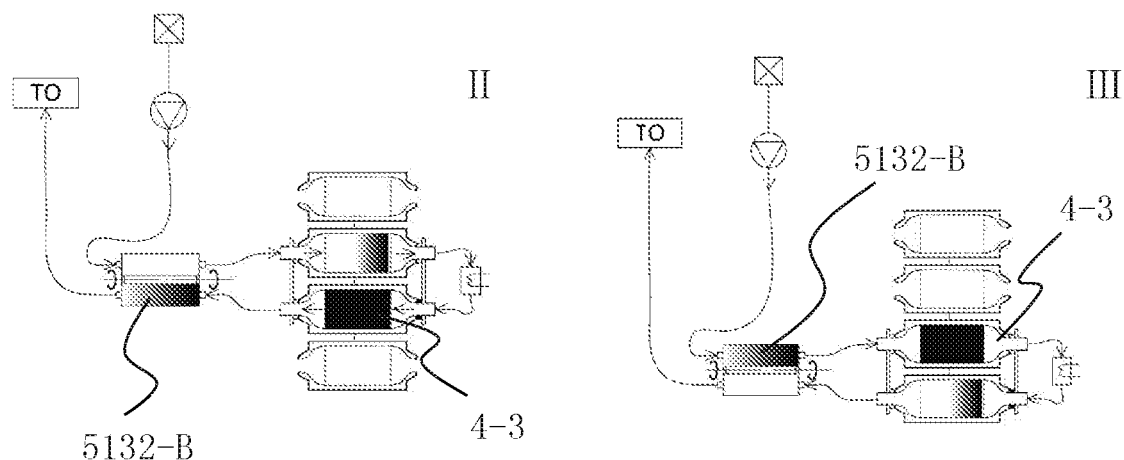

A solution with a higher heat utilization rate is to provide a regenerative heat exchanger. It further includes a valve-switched regenerative heat exchanger or a rotary regenerative heat exchanger with a heat accumulator. The rotary regenerative heat exchanger with a heat accumulator 5132 is preferred herein, as shown in FIG. 7.

Reference is made to FIGS. 8a-d. The heat accumulator 5132 is divided into two portions A and B. In operation, in the later stage of a desorption cycle I of an adsorption unit group, the high-temperature desorptive gas discharged from the adsorption unit 4-2 transfers heat to the heat accumulator 5132-A portion of the rotary regenerative heat exchanger 5132. When the desorption cycle I of the adsorption unit group ends, and is switched to the desorption cycle II of another adsorption unit group, the heat accumulator is rotated by 180°. At the initial stage of the desorption cycle II, the heat accumulator 5132-A portion heats the desorptive gas entering the adsorption unit 4-2 such that the heat is reused. At the rear-end stage of the desorption cycle II, the high-temperature desorptive gas discharged from the adsorption unit 4-3 heats the heat accumulator 5132-B portion. In a desorption cycle III, the heat of the heat accumulator 5132-B portion is transferred back to the adsorption unit 4-3, and the process of the desorption cycle II is repeated.

Embodiment 4

Figure 9:
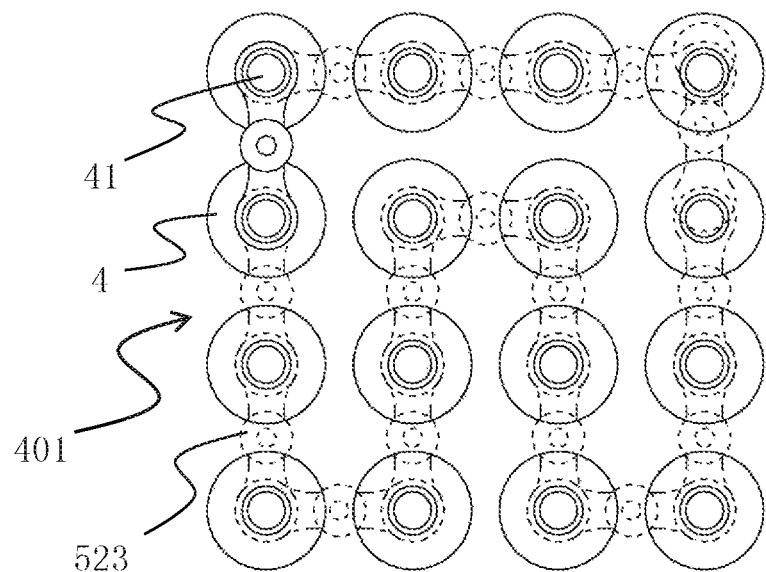
FIG. 9 is a schematic diagram illustrating a trajectory formed by pairing adsorption unit groups each composed of two adsorption units, and a core.
Figure 10:
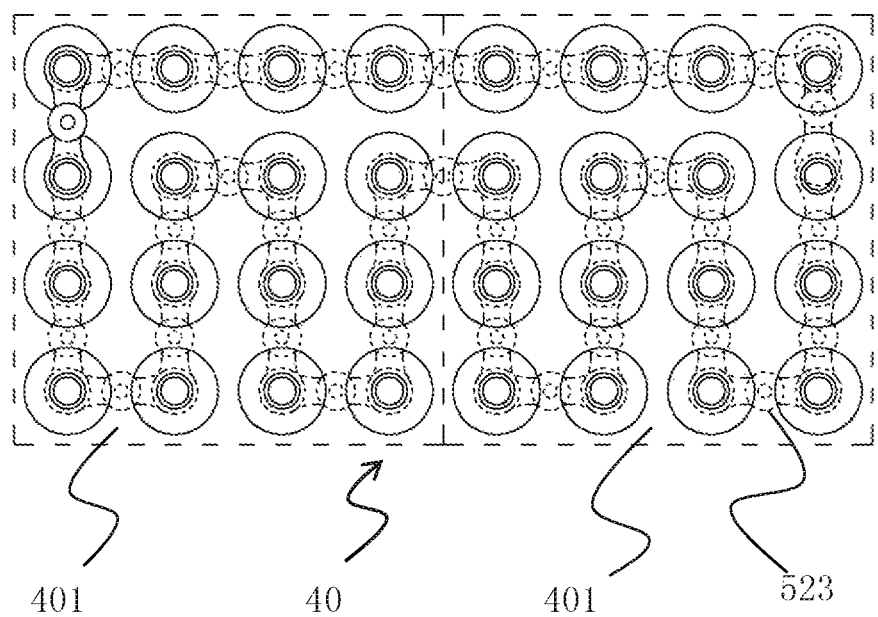
FIG. 10 is a schematic diagram illustrating the trajectory formed by pairing the adsorption unit groups of the adsorption units, and two horizontally expanded cores.
Figure 11:
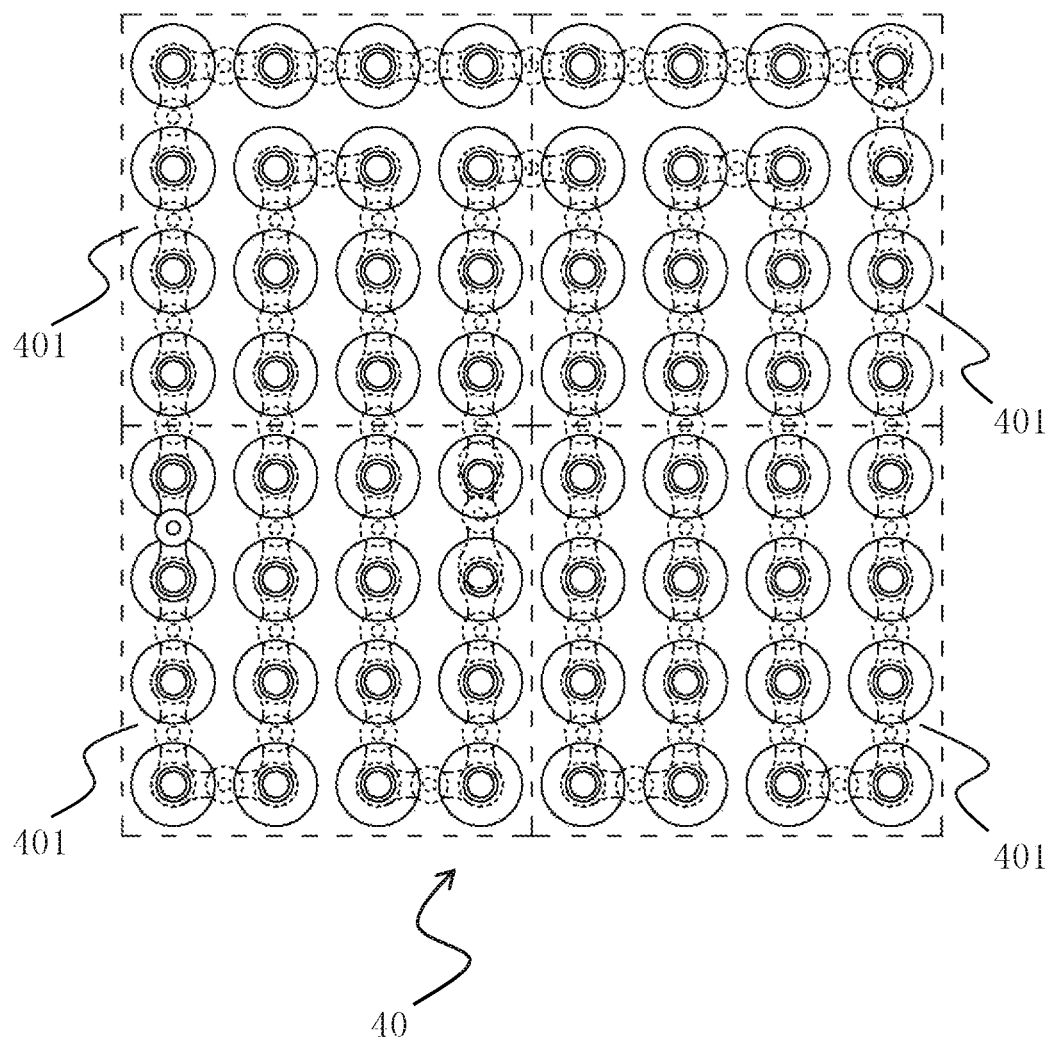
FIG. 11 is a schematic diagram illustrating the trajectory formed by pairing the adsorption unit groups of the adsorption units, and four longitudinally stacked+horizontally expanded cores.

See FIGS. 9-11 for a gas adsorption concentration apparatus with a modular structure.

For the functional requirements of different adsorbate gas treatment capacities, a movable desorption system may be used, in which the adsorption cores of different adsorption units are configured to correspond to different coverage ranges but the main configurations such as the hot air desorption apparatus are the same. From the perspective of reducing the production cost of products, if the core 40 uses a modular structure and a moving track of the movable desorption apparatus also uses a structure that is easy to assemble and extend, it is possible to flexibly combine a few types or even a single type of adsorption core module 401 and a single core component of the movable adsorption apparatus into a gas adsorption concentration apparatus having various processing capacities.

FIGS. 9-11 show three types of combined cores formed in different combinations of core modules. In the figures, only the front appearance of the adsorption unit 04, a rotary joint connected to the head end 41 of the adsorption unit in the movable adsorption apparatus and a trajectory formed by its movement to different positions are shown.

The invention claimed is:

1. A gas adsorption concentration apparatus, comprising a housing, an adsorber gas inlet, an adsorber gas outlet, a plurality of adsorption units and a set of movable desorption apparatus, wherein each of the plurality of adsorption units is a fixed-bed adsorber, all the adsorption units are arranged in parallel and connected via a supporting connection structure to form an airtight adsorption core, such that an adsorbate gas entering the housing from the adsorber gas inlet is capable of reaching the adsorber gas outlet only by passing through the adsorption units of the adsorption core; the movable desorption apparatus is composed of a hot air desorption apparatus and a mechanical movement apparatus; the hot air desorption apparatus enables head ends on one side of an adsorption unit group composed of two adsorption units to be respectively in communication with a desorptive gas supply apparatus and a desorptive gas treatment apparatus by means of flexible pipelines, this part of the hot air desorption apparatus is called an IO end, and two head ends on the other side of the adsorption unit group are in communication with a pipeline including a gas heating apparatus; a desorptive gas from the desorptive gas supply apparatus passes through the two adsorption units of the adsorption unit group in sequence to the desorptive gas treatment apparatus; during this process, the desorptive gas performs heating, desorption and regeneration on an adsorbent in one of the adsorption units, and at the same time, recovers the heat absorbed by an adsorbent in the other adsorption unit in a desorption process and cools the adsorption unit; and the mechanical movement apparatus supports the hot air desorption apparatus and completes connection and switching between the hot air desorption apparatus and each adsorption unit group in sequence under the drive of controlled power.

2. The gas adsorption concentration apparatus of claim 1, wherein a heat exchange apparatus is provided at the IO end of the hot air desorption apparatus, and the heat exchange apparatus serves to perform heat exchange between two desorptive gas pipelines passing through the IO end.

3. The gas adsorption concentration apparatus of claim 2, wherein the heat exchange apparatus is a rotary heat exchanger with an intermittent heat accumulator.

4. The gas adsorption concentration apparatus of claim 1, wherein fixed-bed adsorption units composed of a plurality of adsorption units are arranged in a parallel matrix, and allow a trajectory formed by pairing the adjacent fixed-bed adsorption units in up-down and left-right directions to rightly form an end-to-end closed curve covering all the fixed-bed adsorption units.

5. The gas adsorption concentration apparatus of claim 1, wherein the adsorption core is configured to be of a modular structure which is transversely expandable and longitudinally stackable, and the movable desorption apparatus is correspondingly configured to be of a flexible expansion structure with an expandable coverage range.

* * * * *